6698X
N. Williams,
Clover Huller.
Patented Aug 12. 1831.
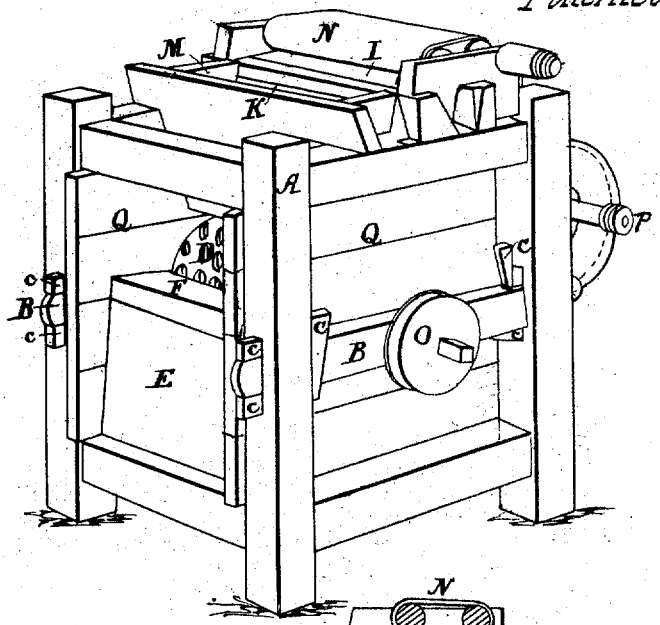
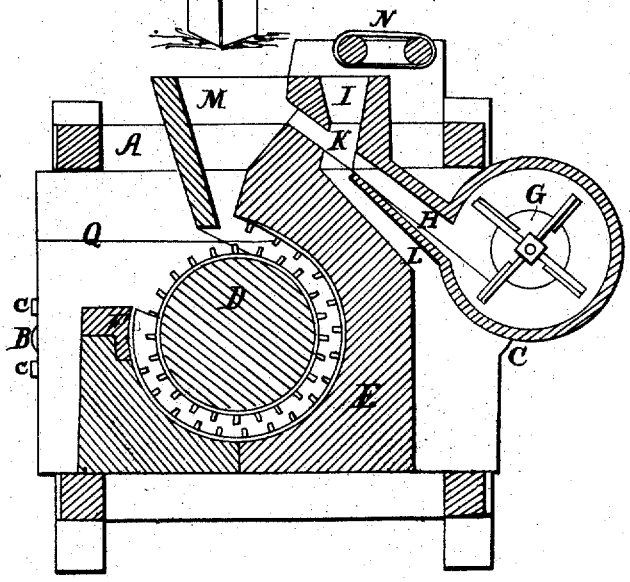

6698x Aug. 12. 1831

William Williams of Buckingham Township Pennsylvania

Letters Patent.

The Schedule referred to in these Letters Patent, and making part of the same, containing a description in the words of the said William Williams himself of his improvement, being a machine for hulling and cleaning Clover Seed.

Be it known that I, William Williams, of Buckingham Township, Bucks County, Pennsylvania, have made an improvement, being a machine for hulling and cleaning clover seed; which is described as follows.. This machine consists of the following parts. 1, The Frame. 2, The toothed cylinder. 3 The curved bed of teeth and grater. 4, The Fan. 5, Flues or opening for the wind, clover seed, gravel, dirt, &c to pass. 6. the Feeder. 7. The Hopper. 8 The gearing. 1. The frame is construct-ed by uniting together by mortises and tenons, or in any other way, four posts, four sills, and four top pieces, sufficiently large and strong for the purpose intended. In the posts are to be cut openings to receive the head blocks to be hereafter described. 2, The toothed Cylinder. This Cylinder is about 4 feet long and 2 feet 4 inches diameter, and is constructed by making two round heads and nailing staves or rits of wood on them, and then covering the cylinder with sheet Iron, nailed fast. Holes are to be punched in the sheet iron in rows, about 3/8ths of an inch apart; and teeth about 3/8ths of an inch long cut to a proper angle, are driven in rows all around the cylinder. The axle of the cylinder turns on gudgeons in moveable head blocks which can be moved up and down, or backward and forward, by means of wedges or keys in the openings cut in the frame.

3. The curved Bed of teeth and grater. A half circle made to the same curvature as the cylinder, encloses one half of the cylinder and one fourth of the cylinder forming the lower side is covered with another segment of the curved bed and grater. The First part or semicircle is covered with sheet iron filled with teeth of the sam

[illegible]

6698x Aug 12, 1831 same size and figure as those of the cylinder, The second part, or quarter circle is made of sheet Iron, filled also with teeth in the upper part and a grater about 7 inches in width, in front, and and is movea-ble to and from the cylinder, 4 The fan. is made in the usual form, and is placed at the hinder part of the machine, so as to operate in blowing the Clover seed &c along the flue to be hereafter described.

5. The flues or openings for the wind, Clover seed, gravel, dirt &c. to pass. A flue from the fan leads towards the hopper of the machine. there is also another passage or opening nearly at right angles with the first, to admit the gravel or dirt to fall down. The first flue after crossing the passage for the dirt &c. conveys by the wind. the Clover seed, directly to the the cylinder 6. The feeder. This is constructed by making a common feeder of cloth or leather to pass over two rollers, placed on the top of the machine. A pul-ley is fixed on the axis of one of them for giving motion.

7. The Hopper. This is made in the usual form: is open at top to receive the Clover seed; and has a passage to let the seed fall upon the cylinder. and an opening corresponding to the flue from the fan. It is placed on the top of the machine. 8. The gearing. One pulley is placed on the axle of the cylinder, another on the axle of the fan. and another on the axle of the feeder. A strap or band passes over these pulleys and motion is given to the machine by the application of any power.

Operation. The clover seed is placed upon the feeder, and motion be-ing given to the machine by animal or other power. it descends into the passage where it meets the blast from the fan: the gravel, dirt, &c. being heavy fall down the vertical opening, and the clover is blown through the opening of the hopper into it: the clover then descends to the cylinder where the seed is rubbed out between the teeth of the cylinder and concav-ed bed: it is farther rubbed out by the grater in front. The cylinder can be raised or depressed, or moved backward or forward, at pleasure by means of the wedges and head blocks. This machine separates buck horn from clover seed, on account of the buck horn being heavier and fall-ing down with the dirt, &c. and likewise all hard and heavy substan-ces that would injure the teeth of the machine are separated from the clover seed.

What I claim as my invention is the peculiar arrangement of the sever-
al parts [illegible] before described machine for hulling and cleaning clover seed:
and particularly in applying the wind of a fanning machine to separate
the clover seed from gravel, Buck horn, and all heavy hard substances
which would injure the teeth of the machine. For a farther illus-
tration of my Invention I refer to the model and drawing of the same
deposited in the Patent Office

Witnesses
Wm. P. Elliot
Chas M. Keller

William Williams

Exd.
[illegible]

938 [illegible]